United States Patent
Bernard et al.

(10) Patent No.: US 10,473,032 B2
(45) Date of Patent: Nov. 12, 2019

(54) MULTIPOINT FUEL INJECTION SYSTEM FOR A TURBOMACHINE AND ASSOCIATED REGULATION METHOD

(71) Applicant: SNECMA, Paris (FR)

(72) Inventors: Clement Bernard, Moissy-Cramayel (FR); Loic Pora, Moissy-Cramayel (FR); Sebastien Chalaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 299 days.

(21) Appl. No.: 14/916,077

(22) PCT Filed: Sep. 1, 2014

(86) PCT No.: PCT/FR2014/052154
§ 371 (c)(1),
(2) Date: Mar. 2, 2016

(87) PCT Pub. No.: WO2015/033046
PCT Pub. Date: Mar. 12, 2015

(65) Prior Publication Data
US 2016/0195020 A1    Jul. 7, 2016

(30) Foreign Application Priority Data

Sep. 3, 2013 (FR) .................................... 13 58424
Nov. 20, 2013 (FR) .................................... 13 61430

(51) Int. Cl.
*F02C 7/228* (2006.01)
*F02C 7/232* (2006.01)
(Continued)

(52) U.S. Cl.
CPC .............. *F02C 7/228* (2013.01); *F02C 7/222* (2013.01); *F02C 7/232* (2013.01); *F02C 9/32* (2013.01); *F05D 2270/3015* (2013.01)

(58) Field of Classification Search
CPC .. F02C 7/228; F02C 9/32; F02C 7/222; F02C 7/232; F02C 9/34; F23N 1/002;
(Continued)

(56) References Cited

U.S. PATENT DOCUMENTS 4,760,696 A * 8/1988 Rooks ....................... F02C 7/22
                                                        60/39.281
5,809,771 A * 9/1998 Wernberg ............... F02C 7/228
                                                        60/39.094
(Continued)

FOREIGN PATENT DOCUMENTS

EP    1988267    11/2008
EP    2063087    5/2009
(Continued)

OTHER PUBLICATIONS

French Search Report, dated May 30, 2014, French Application No. 1358424.
(Continued)

*Primary Examiner* — Ted Kim
(74) *Attorney, Agent, or Firm* — Womble Bond Dickinson (US) LLP

(57) ABSTRACT

The invention concerns a fuel system (1) for a turbomachine comprising: —a control circuit (9a), —a main circuit (9b), —a flow rate regulator (2), suitable for regulating the flow of fuel in the control circuit (9a) and in the main circuit (9b) depending on the speed of the turbomachine, and —a drain tank (4) being designed to draw fuel from, store fuel in and drain fuel into the main circuit (9b) on the basis of the pressure difference between the main circuit (9b) and the
(Continued)

tank (5) or the high-pressure pump (6) to which it is connected.

11 Claims, 4 Drawing Sheets

(51) Int. Cl.
    *F02C 9/32*     (2006.01)
    *F02C 7/22*     (2006.01)

(58) Field of Classification Search
    CPC .. F23N 2037/02; F23K 5/04; F23K 2301/206; F05D 2220/32; F05D 2270/3015
    USPC ...................................................... 60/39.094
    See application file for complete search history.

(56) References Cited

U.S. PATENT DOCUMENTS

| | | | |
|---|---|---|---|
| 6,334,296 B2* | 1/2002 | Futa, Jr. | F02C 7/228 60/39.094 |
| 7,200,985 B2* | 4/2007 | Tuttle | F02C 7/22 60/39.094 |
| 2002/0184884 A1* | 12/2002 | McCarty | F02C 7/22 60/773 |
| 2003/0089113 A1* | 5/2003 | Simunek | F02C 9/28 60/773 |
| 2006/0254282 A1* | 11/2006 | Riley | F02C 9/28 60/773 |
| 2008/0115481 A1* | 5/2008 | Maker | F02C 7/232 60/39.094 |
| 2010/0132368 A1* | 6/2010 | Lawrence | F02C 7/232 60/790 |

FOREIGN PATENT DOCUMENTS

| | | |
|---|---|---|
| EP | 2535644 | 12/2012 |
| GB | 2320063 | 6/1998 |

OTHER PUBLICATIONS

International Search Report with English Language Translation, dated Dec. 4, 2014, Application No. PCT/FR2014/052154.

* cited by examiner

MULTIPOINT FUEL INJECTION SYSTEM FOR A TURBOMACHINE AND ASSOCIATED REGULATION METHOD

FIELD OF THE INVENTION

The present invention relates to the field of turbine engine combustion chambers, aircraft in particular, and more particularly relates to air and fuel injection systems in these combustion chambers.

The invention relates more precisely to injection systems with dual circuit fuel injection, which comprise a central nozzle, currently called pilot nozzle, delivering a permanent fuel flow rate optimised for low speeds, as well as a peripheral nozzle, sometimes called main nozzle, which delivers an intermittent fuel flow rate optimised for high speeds. These injection systems have been developed for improved adaptation of the injection of air and fuel at different operating speeds of combustion chambers to reduce their fuel consumption and their emission of pollutants such as nitrogen oxides and fumes.

TECHNOLOGICAL BACKGROUND

An aircraft turbine engine generally comprises a fuel tank, a combustion chamber and a fuel system adapted to regulate the flow of fuel from the fuel tank towards the combustion chamber.

The fuel system comprises a set of fuel nozzles disposed in the combustion chamber, a fuel pump for pressurising from the fuel tank, a fuelmetering unit (FMU) for controlling the flow of fuel to the nozzles, and a fuel supply circuit fluidically connecting the fuelmetering unit to the fuel nozzles.

During start-up of the turbine engine, fuel is pumped from the fuel tank to the FMU by the pump, and once there is enough start-up pressure, the FMU sends fuel to the nozzles.

The fuel system can comprise multiple flow paths. For example, a fuel system can comprise two sets of nozzles (a main set and a secondary set), pipes for each set and a flow divider valve arranged downstream of the FMU.

In such systems, fuel is delivered to the primary and secondary nozzles as a function of the speed of the turbine engine. For example, during start-up of the turbine engine, fuel is initially supplied only to the primary nozzles by means of a primary supply circuit. However, once fuel coming from the primary fuel nozzles which burns evenly and satisfactorily, fuel is then also supplied to the secondary nozzles by means of a secondary supply circuit. In other terms, the primary supply circuit supplies a pilot flow which triggers the combustion process, while the secondary supply circuit has a main flow rate, adapted to complete and intensify the combustion process, once the pilot flow is burning constantly.

To reduce problems linked to the presence of residual fuel in the conduits of the fuel system after the turbine engine has been shut-down, document U.S. Pat. No. 5,809,771 proposes purging the conduits of the fuel system by means of a valve connected to the pilot and main nozzles, adapted to suction, store then return fuel when the turbine engine is stopped.

But operation of the fuel system is directly controlled by the pressure available at the outlet of the FMU, which does not sufficiently adapt the flow rate to the speed of the turbine engine, or evolve the fuel distribution values over time, for example in considering the ageing of the turbine engine. Also, in document U.S. Pat. No. 5,809,771 the fuel is purged only when the turbine engine is shutdown. Also, using two fuel supply circuits often involves different pressure losses between the two circuits.

Finally, with the main supply circuit being on flow intermittent rate, coke risks forming in the conduits under the effect of severe conditions which the fuel system can undergo, especially temperature.

Document EP 2 535 644 proposes a fuel system for a turbine engine, adapted to inject fuel into a combustion chamber of the turbine engine comprising a pilot circuit, a main circuit and a flow rate regulator. However, this fuel system comprises no means for preventing the formation of coke when the main circuit is not passing.

Document EP 2 063 087 as such also describes a fuel system for a turbine engine, adapted to inject fuel into a combustion chamber of the turbine engine comprising a pilot circuit, a main circuit and a flow rate regulator. This document also proposes purging the circuits when the engine is stopped. The purging means are however not specified.

Finally, document EP 1 988 267 describes a fuel system for a turbine engine, adapted to inject fuel into a combustion chamber of the turbine engine comprising a pilot circuit, two main circuits, a flow rate regulator and a purge tank. The configuration of the fuel system is such that here too it purges the main circuits only when the turbine engine is shutdown.

SUMMARY OF THE INVENTION

An aim of the invention is to propose a fuel system, especially for an aircraft turbine engine, comprising two fuel supply circuits configured to inject fuel into the combustion chamber as a function of the speed of the turbine engine, limiting the risks of coke formation, and if required by dispensing with differences in pressure losses between the two circuits.

For this, the invention proposes a fuel system for a turbine engine, adapted to inject fuel into a combustion chamber of the turbine engine, comprising:
  a pilot circuit, adapted to inject fuel into the combustion chamber,
  a main circuit, adapted to inject fuel into the combustion chamber, and
  a flow rate regulator, adapted to regulate distribution of the fuel flow rate between the pilot circuit and the main circuit as a function of the speed of the turbine engine, said flow rate regulator comprising a mobile spool between a first configuration, in which the main circuit is blocked and the pilot circuit is passing, and a second configuration in which at the same time the main circuit and the pilot circuit are passing, and
  a fuel tank, a high-pressure pump, adapted to pressurise the fuel at the outlet of the fuel tank, and a purge tank, connected on one side selectively to the tank or to the high-pressure pump, and on another side to the main circuit, said purge tank being adapted to suction, store and purge fuel in the main circuit as a function of the pressure difference between the main circuit and the tank or the high-pressure pump to which it is connected.

Some preferred though nonlimiting characteristics of the fuel system described hereinabove are the following:
  it further comprises, downstream of the flow rate regulator, a pressure regulator adapted to modify the pressure in the pilot circuit and the main circuit and reduce the differences in pressure losses between the pilot circuit and the main circuit upstream of the pressure regulator, the purge tank is connected to the main circuit downstream of the pressure regulator, the purge tank is controlled by the flow rate regulator which selectively connects the purge tank to the fuel tank or to the high-pressure pump, such that:

in the first configuration of the spool, the purge tank is connected to the tank and stores fuel contained in the main circuit, and in the second configuration of the spool, the purge tank is connected to the high-pressure pump and purges in the main circuit the fuel stored when the spool was in the first configuration, the pressure regulator comprises regulating means adapted to modify a passage section of the main circuit and of the pilot circuit downstream of the flow rate regulator to limit pressure losses in said circuits, the regulating means are controlled by two antagonist pressures respectively corresponding to the pressure at the inlet of the pilot circuit and to the pressure at the inlet of the main circuit to adapt the passage section of said main and pilot circuits, the regulating means further comprise a spool adapted to adjust the passage section of the main circuit and of the pilot circuit, the position of the spool being in dynamic balance as a function of the pressure at the inlet of the pilot circuit and of the pressure at the inlet of the main circuit, it further comprises a fuelmetering unit FMU upstream of the flow rate regulator, and the flow rate regulator is actuated by a servo valve and further comprises a linear variable differential transformer LVDT adapted to determine the configuration of the spool in the flow rate regulator.

According to a second aspect, the invention also proposes a turbine engine comprising a fuel system adapted to inject fuel into the combustion chamber of the turbine engine as described hereinabove.

According to a third aspect, the invention proposes a regulating method executing a fuel system injecting fuel having an inlet flow rate in a combustion chamber of a turbine engine by means of a pilot circuit and a main circuit as described hereinabove, said regulating method comprising the following steps:

regulating the distribution of the fuel flow rate in the pilot circuit and in the main circuit as a function of the speed of the turbine engine by moving the mobile spool between the first configuration, in which the main circuit is blocked and the pilot circuit is passing, and the second configuration in which at the same time the main circuit and the pilot circuit are passing, and controlling the purge tank as a function of the position of the mobile spool of the flow rate regulator by selectively connecting the purge tank to the tank or the high-pressure pump so as to suction, store or purge fuel in the main circuit.

Some preferred but nonlimiting characteristics of the regulating method described hereinabove are the following:

distribution of the inlet fuel flow rate between the pilot circuit and the main circuit is regulated by controlling the position of the mobile spool which modifies a fuel passage section at the inlet of the pilot circuit and a fuel passage section at the inlet of the main circuit, the pilot circuit and the main circuit receiving each a fraction of the inlet flow rate, each position of the mobile spool fixing the fraction of the inlet flow rate received by the pilot circuit and the fraction of the inlet flow rate received by the main circuit, irrespective of the inlet fuel flow rate, enabling regulation of the distribution of the inlet flow rate from control of the position of the spool, and the method further comprises a step during which the distribution of the inlet fuel flow rate is corrected so as to respect a minimum or maximum fuel flow rate to be received for the pilot circuit and/or the main circuit;

the method comprises the step of equalising the pressure in the main circuit, upstream of a pressure regulator of the fuel system, and the pressure in the pilot circuit, upstream of said pressure regulator;

the method comprises the steps of selecting a fraction X of the inlet fuel flow rate to be received by the pilot circuit or by the main circuit, with X between 0 and 100%, and moving the mobile spool to a position enabling said fraction X to be obtained;

the pilot circuit and the main circuit have an inlet port having a section of identical form, the method comprising the step of fixing the fraction $X_{circuit}$ of the inlet fuel flow rate received by the pilot circuit (9a), respectively by the main circuit (9b), from the formula:

$$X_{circuit} = \frac{S_{circuit}}{S_{pilot} + S_{main}},$$

with $S_{circuit}$ the surface of the fuel passage section at the inlet of the pilot circuit, respectively the main circuit, $S_{pilot}$ the surface of the fuel passage section of the pilot circuit, and $S_{main}$ the surface of the fuel passage section of the main circuit;

the pilot circuit and the main circuit have an inlet port having a section of different form, the method comprising the step of fixing the fraction $X_{circuit}$ of the inlet fuel flow rate received by the pilot circuit, respectively by the main circuit, from the formula:

$$X_{circuit} = \frac{K_{circuit}S_{circuit}}{K_{pilot}S_{pilot} + K_{main}S_{main}},$$

with $S_{circuit}$ the surface of the fuel passage section at the inlet of the pilot circuit, respectively the main circuit, $K_{circuit}$ a constant connected to the form of the section of the inlet port of the pilot circuit, respectively the main circuit, $S_{pilot}$ the surface of the fuel passage section of the pilot circuit, and $S_{main}$ the surface of the fuel passage section of the main circuit;

the method comprises the step of, as a function of a range of minimum and maximum flow rate for the pilot circuit and the main circuit, controlling the position of the mobile spool so as to isolate the surface of the passage section from the fuel of the pilot circuit, respectively the main circuit, in a given interval, such that a pressure loss of the pilot circuit, respectively the main circuit, is in a predefined interval.

The work leading to this invention has received financing from the Programme Seventh Framework FP7/2007-2013 of the European Union within the scope of the subvention agreement No. ACP1-GA-2011-283216-LEMCOTEC.

BRIEF DESCRIPTION OF THE DRAWINGS

Other characteristics, aims and advantages of the present invention will emerge more clearly from the following detailed description and with respect to the appended drawings given by way of nonlimiting examples and in which.

DETAILED DESCRIPTION OF AN EMBODIMENT

Fuel System

Figure 1:
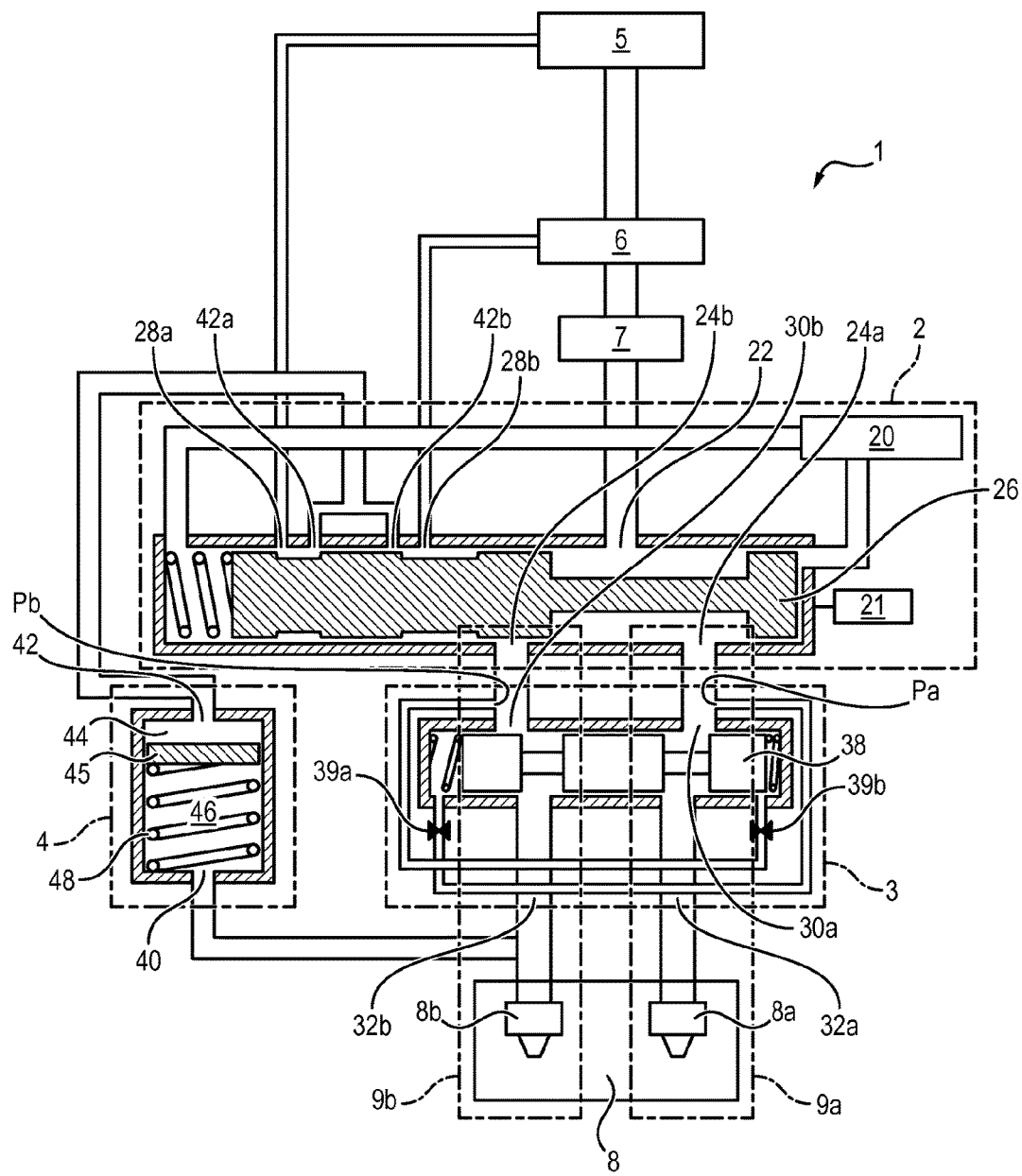
FIG. 1 illustrates an embodiment of a fuel system of a turbine engine according to the invention in a first configuration, corresponding to a low speed of the turbine engine.

A fuel system 1 comprises, from upstream to downstream in the direction of flow of fuel,
- a fuel tank 5,
- a high-pressure pump 6, adapted to pressurise fuel from the tank, and
- a fuelmetering unit FMU 7, supplied with fuel by the high pressure pump 6 and adapted to control the flow of fuel to the combustion chamber 8 by means of a fuel supply circuit.

The fuel supply circuit here comprises two sets of nozzles 8a, 8b, each linked to a supply circuit 9a, 9b and a flow rate regulator 2 (or flow divider valve), arranged downstream of the FMU 7.

More precisely, the supply circuit comprises a pilot circuit 9a, adapted to continuously inject fuel into the combustion chamber 8 by means of pilot nozzles 8a, and a main circuit 9b, adapted to intermittently inject fuel into the combustion chamber 8 by means of main nozzles 8b.

The flow rate of the pilot 9a and main 9b circuits is controlled by means of the flow rate regulator 2, disposed between the FMU 7 and the pilot 8a and main 8b nozzles. The flow rate regulator 2 adjusts the flow rate distribution between each supply circuit 9a, 9b as a function of the speed of the turbine engine, and can be actuated for example by a servo valve 20.

Finally, the fuel system 1 further comprises a pressure regulator 3, disposed downstream of the flow rate regulator 2, and adapted to modify the pressure in the pilot circuit 9a and the main circuit 9b with the aim of reducing or eliminating the differences in pressure losses between the two circuits 9a and 9b upstream of the pressure regulator 3.

More precisely, the flow rate regulator 2 comprises
- an inlet port 22 of the fuel originating from the tank, by means of the high-pressure pump 6 and of the FMU 7,
- a pilot discharge port 24a, adapted to discharge fuel in the pilot circuit 9a towards the pilot nozzle 8a,
- a main discharge port 24b, adapted to discharge fuel in the main circuit 9b towards the main nozzle 8b, and
- a mobile spool 26, comprising a first configuration in which the spool 26 blocks the main discharge port 24b, the pilot discharge port 24a being passing, and a second configuration in which at the same time the pilot discharge port 24a and the main discharge port 24b are passing. In the first configuration, fuel is therefore injected in the combustion chamber 8 by the pilot nozzle 8a only, while in the second configuration, the main nozzle 8b also injects fuel in the combustion chamber 8. In this configuration, the position of the spool 26 respects a distribution percentage of the flow rate between the pilot circuit 9a and the main circuit 9b.

The position of the spool 26 of the flow rate regulator 2 is controlled by the servo valve 20. The fuel system 1 can further comprise a linear variable differential transformer LVDT 21 enabling return of information on the configuration of the spool 26 in the flow rate regulator 2.

The pressure regulator 3 as such comprises:
- a pilot admission port 30a of fuel originating from the pilot discharge port 24a,
- a main admission port 30b of fuel originating from the main discharge port 24b,
- a pilot outlet port 32a, adapted to discharge fuel from the pilot circuit 9a towards the pilot nozzle 8a,
- a main outlet port 32b, adapted to discharge fuel from the main circuit 9b to the main nozzle 8b, each set of admission 30a, 30b and outlet 32a, 32b ports being connected by a supply line of the corresponding circuit, and
- regulating means, adapted to modify the passage section of the lines of the main circuit 9b and of the pilot circuit 9a between the flow rate regulator 2 and the main 8b and pilot 8a nozzles, respectively, to limit the pressure losses in these circuits 9a, 9b.

The regulating means of the pressure regulator 3 comprise a mobile spool 38, adapted to modify the fuel passage section in the lines of the main circuit 9b and of the pilot circuit 9a, between the flow rate regulator 2 and the nozzles 8a, 8b.

For example, the spool 38 is controlled by two antagonist pressures corresponding respectively to the pressure Pa at the pilot admission port 30a and to the pressure Pb at the main admission port 30b. For this purpose, the position of the spool 38 is controlled by the antagonist pressures Pa and Pb by means of a pilot pipe adapted to transplant the pressure at the pilot admission port 30a and apply this pressure to a first side of the spool 38, and a main pipe, adapted to transplant the pressure at the main admission port 30b and apply this pressure to a second side of the spool 38. In this way, the spool 38 is now in dynamic balance as a function of pressures Pa and Pb at the inlet of the regulator 3 in each of the supply circuits of the pilot 8a and main 8b nozzles.

In the appended figures the main circuit 9b is at the left while the pilot circuit 9a is at the right. The pressure Pa transplanted in the pilot circuit 9a is therefore applied to the left side of the spool 38, while the pressure Pb transplanted in the main circuit 9b is applied to the right side of the spool 38.

So, when just the pilot circuit 9a is supplied with fuel by the flow rate regulator 2, the pressure Pa at the pilot admission port 30a is greater than the pressure Pb at the main admission port 30b. So as not to add pressure losses, the spool 38 therefore moves such that it does not block the supply line of the pilot circuit 9a (FIG. 1).

Figure 3:
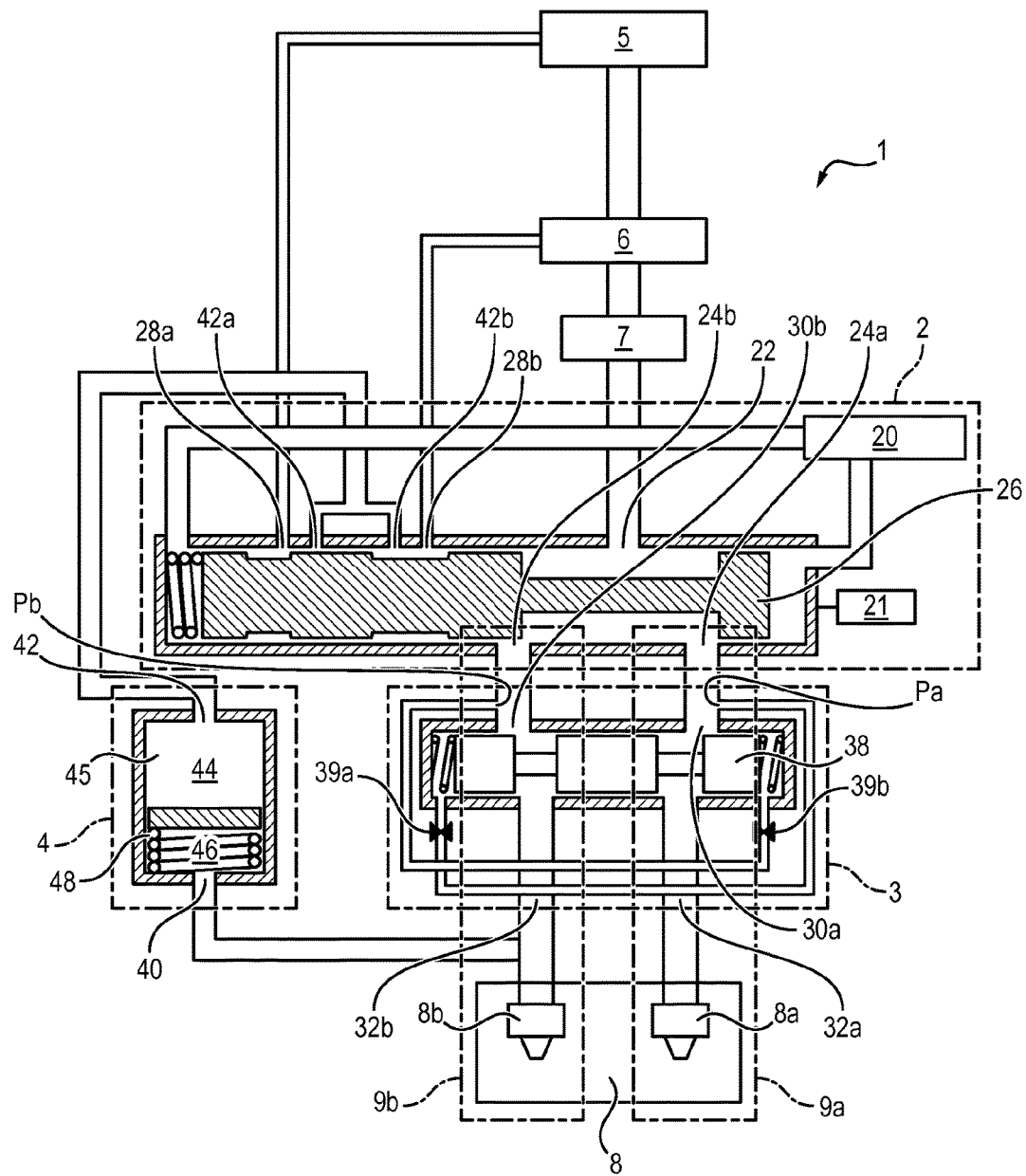
FIG. 3 illustrates the fuel system of FIG. 1 in the second configuration, corresponding to substantial speed of the turbine engine.

However, when the main circuit 9b is also supplied with fuel by the flow rate regulator 2, the pressure Pb rises at the main admission port 30b, which moves the spool 38 of the pressure regulator 3 such that the pressures at the inlet of the pressure regulator 3 in the main circuit 9b and in the pilot circuit 9a are equal. In FIG. 3, the spool 38 has moved to the left relative to FIG. 1.

The position of the spool 38 of the pressure regulator 3 is determined as a function of the value of pressures Pa and Pb. For example, if pressure Pb (at the main admission port 30b) is greater than pressure Pa (at the pilot admission port 30a), the spool 38 moves to reduce the passage section in the supply line of the pilot circuit 9a by partially blocking and enlarging the passage section in the supply line of the main circuit 9b, the consequence of which is to add pressure losses in the pilot circuit 9a and reduce them in the main circuit 9b. Here, because of the main and pilot pipes which transplant the pressure at their respective admission port 30a, 30b, the spool 38 therefore moves to the left.

In an embodiment the pressure regulator 3 can further comprise flow rate limiters 39a, 39b disposed on the main and secondary pipes, adapted to smooth the flow rate and prevent any pressure peaks due to changes of state (passing/blocked) of the main circuit 9b.

The fuel system 1 further comprises a purge tank 4, adapted to suction, store and return fuel in the supply line of the main circuit 9b. The aims are to purge the circuit 9b during nonuse of this circuit to prevent the formation of coke, conserve fuel and then send it back to the circuit 9b to prefill the line when the main circuit 9b passes from the blocked state to the passing state.

For this purpose, the purge tank 4 comprises a purge port 40, connected to the supply line of the main circuit 9b, preferably between the outlet main port 32b of the pressure regulator 3 and the main nozzle 8b, and an actuation port 42, selectively connected to the fuel tank 5 or to the high-pressure pump 6, preferably by means of the flow rate regulator 2. For this, the actuation port 42 is linked to a first port 42a of the regulator 2, adapted to come in fluid communication with a second port 28a of the regulator 2 when the spool 26 is in its first configuration, and a third port 42b of the regulator 2 adapted to come in fluid communication with a second port 28b of the regulator 2 when the spool 26 is in its second configuration.

The purge tank 4 operates similarly to a hydraulic accumulator and comprises a mobile partition wall 45 delimiting an actuation cavity 44 and a purging cavity 46. In this way, according to whether the purge tank 4 is connected to the fuel tank 5 or to the high-pressure pump 6, the pressure difference between the actuation port 42 and the purge port 40 moves the partition wall 45 of the purge tank 4. In fact, the pressure at the purge port 40 is equal to the pressure in the main circuit 9b, at the nozzle 8b, while the pressure at the actuation port 42 is equal either to the pressure of the fuel tank 5 or to the pressure at the outlet of the high-pressure pump 6.

The partition wall 45 can further be stressed towards a rest position by means of a compression spring 48. The stiffness of the spring 48 is determined as a function of the preferred volume for the actuation 44 and purging 46 cavities of the purge tank 4, as well as available operating pressures.

According to an embodiment, the purge tank 4 is controlled by the flow rate regulator 2 such that the configuration of the spool 26 of the flow rate regulator 2 determines the configuration of the purge tank 4.

Therefore, in the first configuration of the flow rate regulator 2, the actuation port 42 of the purge tank 4 is connected to the fuel tank 5 by means of first 42a and second 28a ports. The pressure in the actuation cavity 44 is therefore equal to the pressure of the fuel tank 5, while the pressure in the purging cavity 46 is equal to the pressure in the main circuit 9b, at the main nozzle 8b. Since the pressure in the main circuit 9b is higher than in the fuel tank 5, the partition wall 45 of the purge tank 4 is placed to the side of the actuation port 42.

In the second configuration of the flow rate regulator 2, the actuation port 42 of the purge tank 4 is connected to the high-pressure pump 6 by means of third 42b and fourth 28b ports. The pressure in the actuation cavity 44 is therefore equal to the pressure of the high-pressure pump 6, while the pressure in the purging cavity 46 remains equal to the pressure in the main circuit 9b. Since the pressure in the main circuit 9b is lower than at the high-pressure pump 6, the wall of the purge tank 4 therefore moves in the direction of the purge port 40.

Advantageously, the spool 26 of the flow rate regulator 2 is arranged to connect the actuation port 42 of the purge tank 4 to the high pressure pump 6 via the second passage 28b before it reaches its second configuration so that the purge tank 4 can eject fuel it contains in its purging cavity 46 to the main circuit 9b before the flow rate regulator 2 lets the fuel enter the main circuit 9b by means of the pressure regulator 3.

The fuel system 1 can operate as follows.

When there is low thrust (FIG. 1), only the pilot circuit 9a is flowing, the main circuit 9b being blocked. The spool 26 of the flow rate regulator 2 is therefore in its first configuration, that is, it blocks the main discharge port 24b, the pilot discharge port 24a being passing.

The fuel is pressurised by the pump 6, on command of the FMU 7, then injected into the flow rate regulator 2. Since the spool 26 is in its first configuration, the fuel moves to the pilot supply circuit 9a only, such that the pressure Pa (at the pilot admission port 30a) is greater in the pilot circuit 9a than in the main circuit 9b. The spool 38 of the pressure regulator 3 is therefore positioned so as not to add pressure losses to the pilot line: here, the spool 38 is therefore controlled to the right by the pressure Pa.

Figure 2:
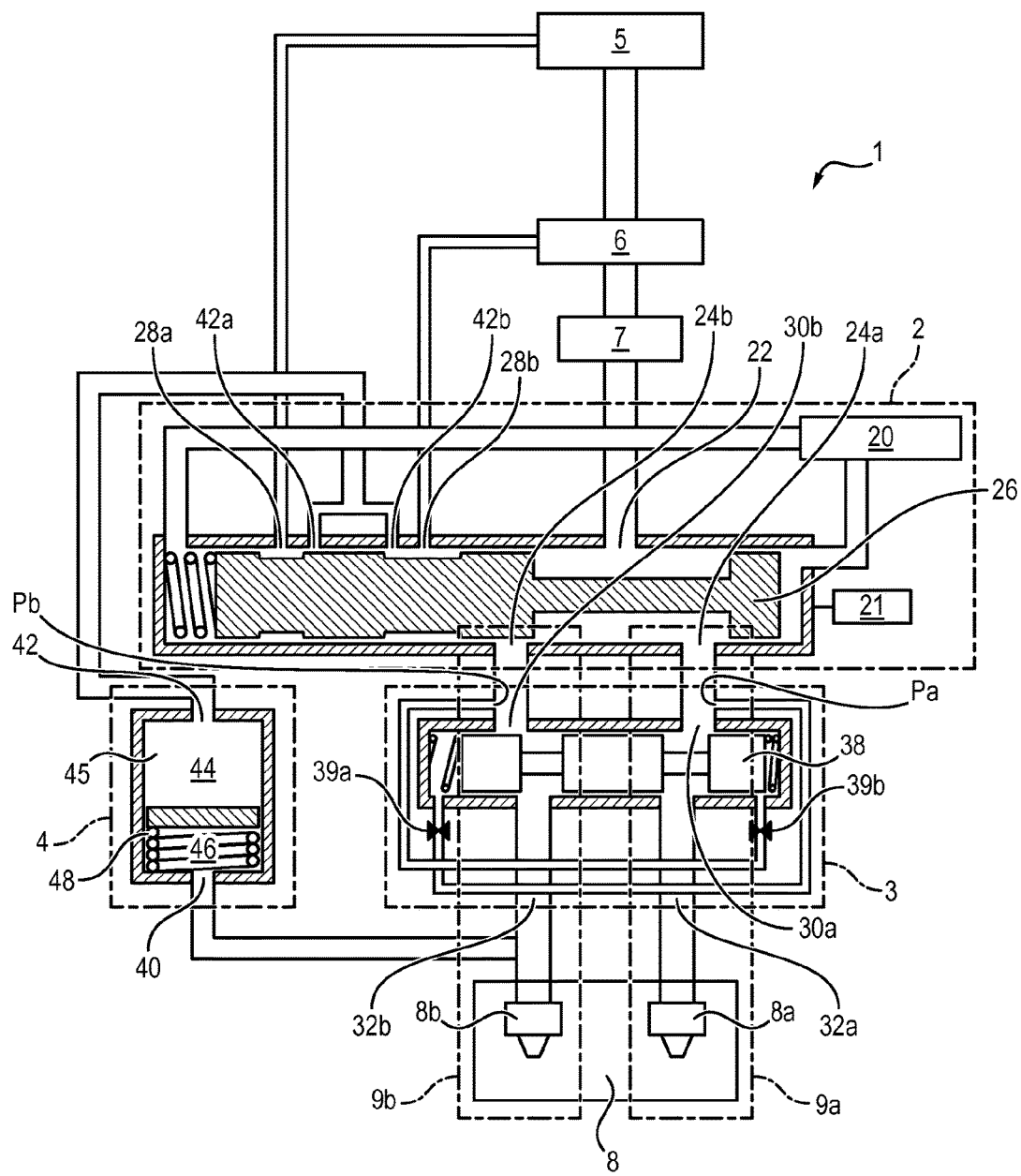
FIG. 2 illustrates the fuel system of the FIG. 1, in a transition configuration between the first configuration and a second configuration, corresponding to a change in speed of the turbine engine.

Also, in this first configuration of the spool 26 of the flow rate regulator 2 the purge tank 4 is connected to the fuel tank 5. The pressure in the actuation cavity 44 is therefore lower than the pressure in the purging cavity 46 such that the partition wall 45 is adjacent to the actuation port 42. The purging cavity 46 therefore contains fuel which has earlier been suctioned into the main circuit 9b (see the description below in relation to FIGS. 2 and 3).

When the thrust becomes greater (FIG. 3), the main circuit 9b must also be flowing. The spool 26 of the flow rate regulator 2 therefore moves to its second configuration to make the main discharge port 24b passing, with the pilot discharge port 24a remaining passing.

Fuel is always pressurised by the pump 6, on command of the FMU 7, then injected into the flow rate regulator 2. Since the spool 26 is in its second configuration, the fuel moves at the same time into the pilot circuit 9a and the main circuit 9b. The pressure Pb (at the main admission port 30b) therefore rises such that the spool 38 of the pressure regulator 3 moves to limit pressure losses at the same time in the pilot circuit 9a and in the main circuit 9b. In the embodiment illustrated in the figures, the spool 38 is controlled to the left by the pressure difference between Pa and Pb until it arrives at its point of balance, that is, when the pressures Pa, Pb at the pilot 32a and main 32b discharge ports are equal.

When the spool 26 of the flow rate regulator 2 moves from the first configuration to the second configuration (FIG. 2), the actuation port 42 of the purge tank 4, which was connected to the fuel tank 5, becomes connected to the high-pressure pump 6. The pressure in the actuation cavity 44 therefore becomes greater than the pressure in the purging cavity 46 such that the partition wall 45 moves in the direction of the purge port 40. The fuel contained in the purging cavity 46 is ejected into the supply line of the main circuit 9b, between the pressure regulator 3 and the main nozzle 8b, which prefills the supply circuit, and therefore reduces the time response for the injection of fuel into the combustion chamber 8 via the main circuit 9b.

When the spool 26 of the flow rate regulator 2 arrives in its second configuration, the actuation port 42 is still connected to the high-pressure pump 6 such that the partition wall 45 remains to the side of the purge port 40. In fact, the pressure of the fuel at the outlet of the high-pressure pump 6 is greater than the pressure of the fuel in the main circuit 9b, due to the presence of regulators 2, 3 and of the FMU 7, between the pump 6 and the main nozzle 8b, which add pressure losses.

It is obvious that shifting from the first configuration to the second configuration of the spool 26 of the flow rate regulator 2, and vice versa, is continuous. The step during which the purge tank 4 injects fuel contained in its purging cavity 46 into the main circuit 9b therefore occurs just before that during which the main circuit 9b becomes passing.

When the thrust becomes low again (FIG. 1), only the pilot circuit 9a must be flowing, the main circuit 9b having to be blocked. The spool 26 of the flow rate regulator 2 therefore returns to its first configuration to block the main discharge port 24b, the pilot discharge port 24a remaining passing.

Fuel therefore moves again only into the pilot circuit 9a such that the pressure Pa (at the pilot admission port 30a) is again greater in the pilot circuit 9a than in the main circuit 9b. The spool 38 of the pressure regulator 3 is therefore moved so as not to add pressure losses to the pilot line: here, the spool 38 is therefore controlled to the right by the pressure Pa.

Also, when the spool 26 of the flow rate regulator 2 returns to its first configuration, the actuation port 42 of the purge tank 4 is reconnected to the fuel tank 5. The pressure in the actuation cavity 44 is therefore lower than the pressure in the purging cavity 46 such that the partition wall 45 moves in the direction of the actuation port 42. Fuel contained in the main circuit 9b is therefore suctioned to fill the purging cavity 46 and limit formation of coke in the main circuit 9b.

Regulation Method

A regulating method implementing the fuel system described earlier is now described. It applies to all the variants of the system such as described previously.

The fuel arriving at the flow rate regulator 2, originating from the fuelmetering unit FMU 7, has a given inlet flow rate which is to be distributed between the pilot circuit 9a and the main circuit 9b.

A regulating method comprises the step of regulating distribution of the fuel inlet flow rate between the pilot circuit 9a and the main circuit 9b by controlling the position of the mobile spool 26.

This regulating method can be managed by a processing unit, of computer type, which controls the servo valve 20 and receives at inlet commands for distribution of the flow rate from an operator, or other systems of an aircraft, such as a central unit of the aircraft.

The mobile spool 26 modifies a fuel passage section $S_{pilot}$ at the inlet of the pilot circuit 9a and a fuel passage section $S_{main}$ at the inlet of the main circuit 9b, the pilot circuit 9a and the main circuit 9b each receiving a fraction of the inlet flow rate.

The section $S_{pilot}$ corresponds to the uncovered section of the discharge port 24a which is located at the inlet of the pilot circuit 9a, and the section $S_{main}$ corresponds to the uncovered section of the discharge port 24b which is located at the inlet of the main circuit 9b.

As a function of the position in translation of the mobile spool 26, the surface of these uncovered sections will be more or less substantial. In this way, the pilot circuit 9a receives a fraction X of the inlet flow rate (X % of the inlet fuel flow rate), and the main circuit 9b receives a complementary fraction 1−X of the inlet flow rate ((1−X) % of the inlet fuel flow rate).

The flow rate W at the inlet of each of the circuits 9a, 9b is shown as:

$$W = K \cdot S \cdot \sqrt{\Delta P \rho}$$

In this formula:

K is a constant dependent on the form of the section of the inlet port of the circuit, respectively pilot and main (that is, here of the discharge port 24a, respectively 24b, of the flow rate regulator 2);

S the surface of the fuel passage section at the inlet of the circuit, respectively pilot and main (in this case the surface of the uncovered section of the discharge port 24a, respectively 24b);

ΔP the pressure loss, corresponding to the pressure difference between the inlet of the flow rate regulator and the inlet of the circuit, respectively pilot and main;

ρ the volume mass of the fuel.

In the event where the pressure losses ΔP are equal for the pilot circuit 9a and the main circuit 9b, and the constants K are equal for the pilot circuit 9a and the main circuit 9b (in the case of inlet sections of the pilot circuit and main circuit of identical forms), the fraction $X_{circuit}$ of the inlet fuel flow rate received by the pilot circuit 9a, respectively by the main circuit 9b, is determined from the formula:

$$X_{circuit} = \frac{S_{circuit}}{S_{pilot} + S_{main}}$$

In this formula:

$S_{circuit}$ is the surface of the fuel passage section at the inlet of the pilot circuit 9a, respectively of the main circuit 9b. This is the surface of the section of the discharge port 24a, respectively 24b, of the flow rate regulator, left uncovered by the mobile spool 26, $S_{pilot}$ is the surface of the fuel passage section at the inlet of the pilot circuit 9a. This is the surface of the section of the discharge port 24a of the flow rate regulator, left uncovered by the mobile spool 26, and $S_{main}$ is the surface of the fuel passage section at the inlet of the main circuit 9b. This is the surface of the section of the discharge port 24b of the flow rate regulator, left uncovered by the mobile spool 26.

This formula therefore fixes the fraction of the inlet flow rate to be received by each circuit from the position of the mobile spool.

In fact, the position of the mobile spool 26 fixes the fuel passage section at the inlet of the pilot circuit 9a and at the inlet of the main circuit 9b.

Consequently, each position of the mobile spool 26 fixes the fraction $X_{pilot}$ of the inlet flow rate received by the pilot circuit 9a and the fraction $X_{main}$ of the inlet flow rate received by the main circuit 9b, irrespective of the inlet fuel flow rate, enabling regulation of distribution of the inlet flow rate from the control of the position of the spool 26.

The control law of the distribution of the inlet flow rate between the pilot circuit 9a and the main circuit 9b is therefore simplified, as it depends only on the position of the mobile spool 26 and does not depend on the value of the inlet flow rate. The position of the mobile spool 26 is known by the displacement sensor 21.

Also, using a single mobile spool 26 dispenses with errors resulting in use of several metering units which are added in the case of a plurality of metering units.

In the event where the pressure losses ΔP are different at the inlet of the pilot circuit 9a and of the main circuit 9b, the method comprises placing and use of the pressure regulator 3 in the fuel system 1. This pressure regulator equalises:

the pressure Pb in the main circuit 9b, upstream of the pressure regulator 3 of the fuel system 1, and the pressure Pa in the pilot circuit 9a, upstream of said pressure regulator 3.

So, the control of the distribution of the flow rate depends only on the position of the mobile spool 26.

In the event where the pilot circuit 9a and the main circuit 9b have an inlet port having a section of different form, that is, the discharge port 24a and the discharge port 24b have an inlet section of different forms, the fraction $X_{circuit}$ of the inlet fuel flow rate received by the pilot circuit 9a, respectively by the main circuit 9b, is determined from the formula:

$$X_{circuit} = \frac{K_{circuit} S_{circuit}}{K_{pilot} S_{pilot} + K_{main} S_{main}}$$

In this formula:

$S_{circuit}$ is the surface of the fuel passage section at the inlet of the pilot circuit 9a, respectively of the main circuit 9b. This is the surface of the section of the discharge port 24a, respectively 24b, of the flow rate regulator, left uncovered by the mobile spool 26, $K_{circuit}$ is a constant dependent on the form of the section of the inlet port of the circuit, respectively pilot ($K_{pilot}$) and main ($K_{main}$) (that is, the discharge port of the flow rate regulator), $S_{pilot}$ is the surface of the fuel passage section at the inlet of the pilot circuit 9a. This is the surface of the section of the discharge port 24a of the flow rate regulator, left uncovered by the mobile spool 26, and $S_{main}$ is the surface of the fuel passage section at the inlet of the main circuit 9b. This is the surface of the section of the discharge port 24a of the flow rate regulator, left uncovered by the mobile spool 26.

This formula therefore fixes the fraction of the inlet flow rate to be received by each circuit from the position of the mobile spool.

In fact, each position of the mobile spool 26 fixes the fraction of the inlet flow rate received by the pilot circuit 9a and the fraction of the inlet flow rate received by the main circuit 9b, irrespective of the inlet fuel flow rate.

Figure 4:
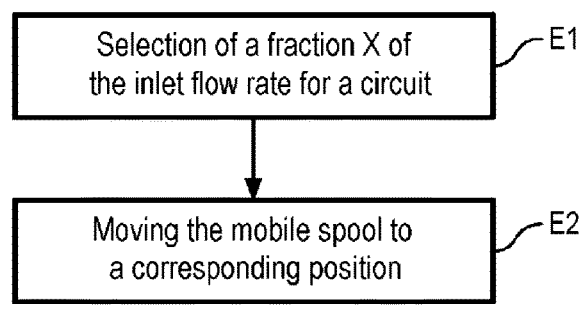
FIG. 4 illustrates steps of an embodiment of a regulating method of the distribution of fuel between the pilot circuit and the main circuit.

Control of the distribution of the inlet flow rate (cf. FIG. 4) can comprise steps of:

selecting (step E1) a fraction X of the inlet fuel flow rate to be received by the pilot circuit 9a or by the main circuit 9b, with X between 0 and 100%. As is understood, selection of the fraction X for one of the circuits fixes the fraction of the other circuit, which receives the complementary fraction 1−X of the flow rate, and moving (step E2) the mobile spool 26 to a position to obtain said fraction X. This position is known, as it has been stressed above that the fraction X of the inlet flow rate depends only on discovered fuel passage sections at inlet of circuits, and optionally a constant $K_{circuit}$ (see the formulas hereinabove).

In this way, the method selects any fraction of the inlet flow rate for each circuit between 0 and 100%, which ensures precision and control over a wide range of values.

Figure 5:
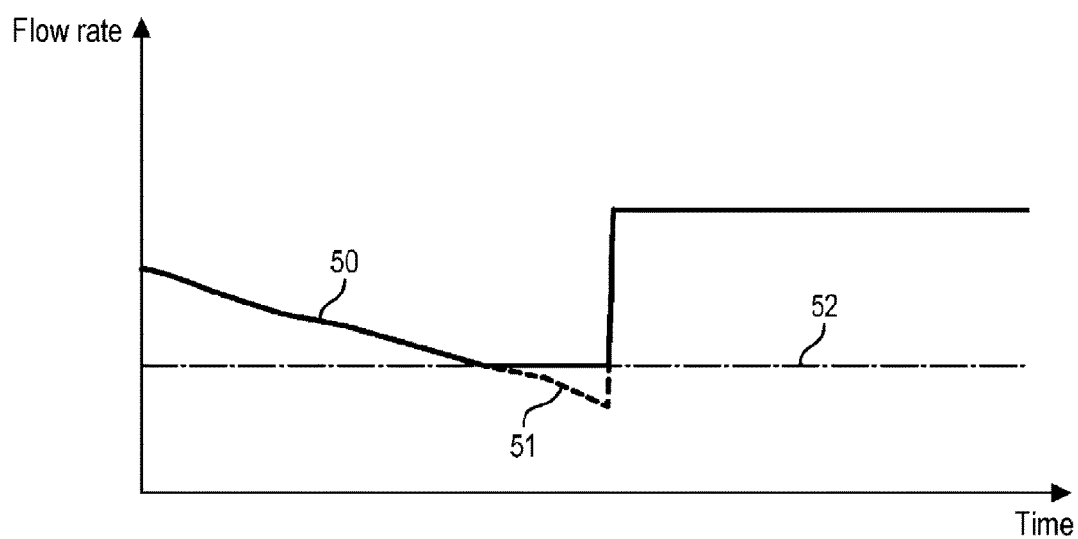
FIG. 5 illustrates steps for correction of the distribution of fuel as a function of flow rate restrictions for one of the circuits.

FIG. 5 illustrates the evolution of the flow rate in the pilot circuit 9a as a function of time, following distribution command of the flow rate.

Following this command, the flow rate in the pilot circuit 9a (curve 50) drops until it reaches a minimum flow rate 52.

To prevent the flow rate in the pilot circuit 9a from dropping below the minimum flow rate 52, the method comprises the step of correcting distribution of the inlet fuel flow rate so as to respect the minimum flow rate for the pilot circuit 9a. As a consequence the computer modifies the position of the mobile spool 26. Because of this command, and as illustrated in FIG. 5, the flow rate received by the pilot circuit 9a moves away from the minimum flow rate 52.

The method applies identically to respect maximum flow rate. This correction can apply both to the pilot circuit 9a and/or the main circuit 9b.

The computer, receiving the value of the inlet fuel flow rate and the distribution value of the fuel between the circuits, can modify the position of the mobile spool 26 as a function of parameters such as richness in the combustion chamber, or the maximum and minimum flow rates to be respected for each circuit.

Furthermore, because of the distribution formulas of the inlet flow rate mentioned hereinabove, the method can comprise the step of controlling the position of the mobile spool 26 so as to isolate the surface of the fuel passage section from the pilot circuit 9a, respectively of the main circuit 9b, in a given interval, to respect:

a predefined range of minimum and maximum flow rate for the pilot circuit 9a, and the main circuit 9b;

a predefined range for the pressure loss of the pilot circuit 9a, the main circuit 9b (corresponding to the pressure difference between the inlet of the flow rate regulator and the inlet of the circuit, respectively pilot and main). This range depends for example on equipment at the outlet of the circuits and its specifications for admissible pressure.

The regulating method improves distribution control. In particular, control from a single mobile spool reduces the bulk and mass of the assembly. Also, distribution errors are reduced. Finally, distribution control of the inlet flow rate, based on the position of the mobile spool, is simplified.

The invention claimed is:

1. A fuel system for a turbine engine, adapted to inject fuel into a combustion chamber of the turbine engine, comprising:

a pilot circuit, adapted to inject fuel into the combustion chamber, a main circuit, adapted to inject fuel into the combustion chamber, and a flow rate regulator, adapted to regulate the fuel flow rate in the pilot circuit and in the main circuit as a function of the speed of the turbine engine, said flow rate regulator comprising a mobile spool between a first configuration, in which the main circuit is blocked and the pilot circuit is passing, and a second configuration in which at the same time the main circuit and the pilot circuit are passing, a pressure regulator downstream of the flow rate regulator, the fuel system being characterized in that it further comprises:

a fuel tank, a high-pressure pump, adapted to pressurise the fuel at the outlet of the fuel tank, and a purge tank, connected on one side via a first port selectively to the fuel tank such that the pressure at the first port is equal to the pressure of the fuel tank, or to the high-pressure pump such that the pressure at the first port is equal to the pressure at an outlet of the high-pressure pump, and the purge tank being connected on another side at a purge port to the main circuit, said purge tank being adapted to suction, store and purge fuel in the main circuit through the purge port as a function of the pressure difference between the main circuit and the fuel tank or the high-pressure pump to which it is connected;

wherein the purge tank is connected to the main circuit downstream of the pressure regulator.

2. The fuel system according to claim 1, wherein the pressure regulator is adapted to modify the pressure in the pilot circuit and the main circuit and reduce the differences in pressure losses between the pilot circuit and the main circuit upstream of the pressure regulator.

3. The fuel system according to claim 2, wherein the pressure regulator comprises regulating means adapted to modify a passage section of the main circuit and of the pilot circuit downstream of the flow rate regulator to limit the pressure losses in said circuits.

4. The fuel system according to claim 3, wherein the regulating means are controlled by two antagonist pressures respectively corresponding to the pressure at the inlet of the pilot circuit and to the pressure at the inlet of the main circuit to adapt the passage section of said main and pilot circuits.

5. The fuel system according to claim 4, wherein the regulating means further comprise a regulating spool adapted to adjust the passage section of the main circuit and of the pilot circuit, the position of the regulating spool being in dynamic balance as a function of the pressure at the inlet of the pilot circuit and of the pressure at the inlet of the main circuit.

6. The fuel system according to claim 1, wherein the purge tank is controlled by the flow rate regulator which selectively connects the purge tank to the fuel tank or to the high-pressure pump, such that:

in the first configuration of the spool, the purge tank is connected to the fuel tank and stores fuel contained in the main circuit, and in the second configuration of the spool, the purge tank is connected to the high-pressure pump and purges in the main circuit the fuel stored when the spool was in the first configuration.

7. The fuel system according to claim 1, further comprising a fuel metering unit FMU upstream of the flow rate regulator.

8. The fuel system according to claim 1, wherein the flow rate regulator is actuated by a servo valve and further comprises a linear variable differential transformer LVDT adapted to determine the configuration of the spool in the flow rate regulator.

9. A turbine engine comprising a combustion chamber, characterized in that it comprises a fuel system adapted to inject fuel into the combustion chamber according to claim 1.

10. A regulating method, characterized in that it uses a fuel system injecting fuel having an inlet flow rate in the combustion chamber of the turbine engine by means of the pilot circuit and the main circuit according to claim 1, said regulating method comprising the following steps:

regulating distribution of the fuel flow rate in the pilot circuit and in the main circuit as a function of a speed of the turbine engine by moving the mobile spool between the first configuration, wherein the main circuit is blocked and the pilot circuit is passing, and the second configuration wherein at the same time the main circuit and the pilot circuit are passing, and controlling the purge tank as a function of the position of the mobile spool of the flow rate regulator by selectively connecting the purge tank to the fuel tank or the high-pressure pump so as to suction, store or purge fuel in the main circuit.

11. The regulating method according to claim 10, wherein:

distribution of the inlet fuel flow rate between the pilot circuit and the main circuit is regulated by controlling the position of the mobile spool which modifies a fuel passage section at the inlet of the pilot circuit and a fuel passage section at the inlet of the main circuit, the pilot circuit and the main circuit each receiving a fraction of the inlet flow rate, each position of the mobile spool fixing the fraction of the inlet flow rate received by the pilot circuit and the fraction of the inlet flow rate received by the main circuit, irrespective of the inlet fuel flow rate, enabling regulation of the distribution of the inlet flow rate from control of the position of the spool, the method further comprising a step during which distribution of the fuel inlet flow rate is corrected so as to respect a minimum or maximum flow rate of fuel to be received for the pilot circuit and/or the main circuit.

* * * * *